United States Patent
Zhang et al.

(10) Patent No.: US 10,848,599 B2
(45) Date of Patent: Nov. 24, 2020

(54) DATA TRANSMISSION METHOD AND GATEWAY AS WELL AS SERVER AND COMPUTER-READABLE STORAGE MEDIUM

(71) Applicant: Beijing Baidu Netcom Science and Technology Co., Ltd., Beijing (CN)

(72) Inventors: Jian Zhang, Beijing (CN); Jiaoren Wu, Beijing (CN); Hao Jiang, Beijing (CN); Ning Liu, Beijing (CN); Yongxin Cui, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 131 days.

(21) Appl. No.: 16/129,447

(22) Filed: Sep. 12, 2018

(65) Prior Publication Data

US 2019/0191014 A1    Jun. 20, 2019

(30) Foreign Application Priority Data

Dec. 19, 2017 (CN) .......................... 2017 1 1378515

(51) Int. Cl.
*H04L 12/00* (2006.01)
*H04L 29/06* (2006.01)
(Continued)

(52) U.S. Cl.
CPC ............ *H04L 69/163* (2013.01); *H04L 12/66* (2013.01); *H04L 67/1095* (2013.01);
(Continued)

(58) Field of Classification Search
CPC ... H04L 69/163; H04L 67/1095; H04L 69/08; H04L 12/66; H04L 67/141; H04L 67/42; H04L 67/28
(Continued)

(56) References Cited

U.S. PATENT DOCUMENTS 6,031,341 A * 2/2000 Yoshizawa .......... H01F 1/15308
                                                        315/219
6,683,883 B1 * 1/2004 Czeiger .................. H04L 12/66
                                                        370/401
(Continued)

FOREIGN PATENT DOCUMENTS

CN         14695591 A      1/2004
CN         101296223 A    10/2008
(Continued)

OTHER PUBLICATIONS

First Chinese Office Action dated May 25, 2020, received for corresponding Chinese Application No. 2017113785155, 7 pages.

*Primary Examiner* — Frantz Coby
(74) *Attorney, Agent, or Firm* — Kinney & Lange, P.A.

(57) ABSTRACT

A data transmission method includes: establishing, by a server, a connection with a client according to a transmission control protocol (TCP) through a gateway with a synchronous proxy mechanism; acquiring, by the server, sequence number conversion information and converting a first TCP sequence number of a first data packet to be sent to the client according to the sequence number conversion information, so that the first TCP sequence number is matched, by the server, with a first acknowledgment number of the second data packet sent by the client; and sending, by the server, the first data packet, for which the first TCP sequence number has been converted, to the client directly. A server, a gateway, and a computer-readable medium are also disclosed.

11 Claims, 3 Drawing Sheets

(51) Int. Cl.
*H04L 29/08* (2006.01)
*H04L 12/66* (2006.01)

(52) U.S. Cl.
CPC ............ *H04L 67/141* (2013.01); *H04L 67/28* (2013.01); *H04L 67/2823* (2013.01); *H04L 67/42* (2013.01); *H04L 69/08* (2013.01)

(58) Field of Classification Search
USPC .................................. 709/203, 202, 217, 226
See application file for complete search history.

(56) References Cited

U.S. PATENT DOCUMENTS

| | | | | |
|---|---|---|---|---|
| 6,862,622 | B2 * | 3/2005 | Jorgensen | H04L 69/168 709/226 |
| 7,046,691 | B1 * | 5/2006 | Kadyk | H04L 12/66 370/466 |
| 7,337,233 | B2 * | 2/2008 | Dillon | H04B 7/18584 709/217 |
| 7,969,976 | B2 * | 6/2011 | Ishikawa | H04L 69/16 370/389 |
| 8,462,800 | B2 * | 6/2013 | Saito | H04L 29/12367 370/401 |
| 8,547,835 | B2 * | 10/2013 | Haddad | H04L 61/2528 370/230 |
| 9,008,618 | B1 * | 4/2015 | Fox | H04L 61/6063 455/410 |
| 2003/0065943 | A1 | 4/2003 | Geis et al. | |
| 2003/0081619 | A1 * | 5/2003 | Phillips | H04L 12/2854 370/400 |
| 2005/0004975 | A1 * | 1/2005 | Prasad | H04L 67/2823 709/203 |
| 2009/0161680 | A1 * | 6/2009 | Ishikawa | H04L 69/16 370/400 |
| 2011/0122870 | A1 * | 5/2011 | Dixon | H04L 47/20 370/389 |
| 2016/0065644 | A1 * | 3/2016 | Kant | H04L 67/02 709/203 |

FOREIGN PATENT DOCUMENTS

| | | |
|---|---|---|
| CN | 101296238 A | 10/2008 |
| CN | 101594359 A | 12/2009 |
| CN | 102025746 A | 4/2011 |
| CN | 16156636 A | 11/2016 |
| CN | 106685930 A | 5/2017 |

* cited by examiner

The initial sequence number

| wscale | sack | mss | timestamp | reserve |

FIG. 5A

Structure of custom TCP option

| tcp base header | 200 | 16 | rst | cport | vport | cip | vip |
|---|---|---|---|---|---|---|---|
| | 1 byte | 1 byte | 2 byte | 2 byte | 2 byte | 4 byte | 4 byte |

FIG. 5B

Structure of seq_info

| tcp base header | 201 | 8 | reserve | delta |
|---|---|---|---|---|
| | 1 byte | 1 byte | 2 byte | 4 byte |

FIG. 5C

DATA TRANSMISSION METHOD AND GATEWAY AS WELL AS SERVER AND COMPUTER-READABLE STORAGE MEDIUM

CROSS-REFERENCE TO RELATED APPLICATION(S)

The present application claims the benefit of priority to Chinese patent application No. 201711378515.5, filed before the State Intellectual Property Office on Dec. 19, 2017, and entitled "Data Transmission Method and Gateway as well as Server and Computer-Readable Storage Medium", which is incorporated in the present application by reference in its entirety.

TECHNICAL FIELD

The disclosure relates to the field of network data transmission, and in particular to a data transmission method and gateway, as well as a server and a computer-readable medium.

BACKGROUND

Currently, a synchronous proxy mechanism (SPM) is typically used at a gateway to establish a transmission control protocol (TCP) connection between a client and a server, so as to defend against a TCP distributed denial of service (TCP DDOS) attack. In the synchronous proxy mechanism, firstly, the client sends a syn packet to the gateway. Upon receipt of the syn packet, the gateway generates an initial sequence number with a TCP option, a current timestamp and the like, and sends a synchronization/acknowledgement (syn/ack) packet to the client. After receiving the syn/ack packet sent from the gateway, the client sends an acknowledgment (ack) packet to the gateway. Then, after receiving the ack packet sent by the client, the gateway parses the acknowledgment number in the ack packet, determines whether the information carried in the acknowledgment number satisfies a rule for generating the initial sequence number, and adds a part of the current timestamp to the initial sequence number. If the duration of the time carried from the acknowledgment number and that of the current time exceed a threshold, it is considered that the ack packet fails to be verified; otherwise, it is considered that the ack packet succeeds to be verified. After being verified, the ack packet causes the establishment of a new connection between the client and the gateway. In this case, since the gateway acts as a server, the client deems that the connection is established successfully, and data is ready to be sent.

Next, the gateway sends a syn packet to the server, and the server returns a syn/ack packet to the gateway. Then the gateway sends an ack packet to the server to perform the connection between the gateway and the server. Hence, the TCP connection is established between the client and the server.

In practical applications, both a data packet sent by the client and a data packet sent by the server pass through the gateway. If the traffic is increased, normal access may fail, or even network congestion or network shutdown may be caused. Moreover, the gateway handles the messages sent by the client and the server at the same time, thus increasing the processing time delay and reducing the user experience.

Based on the above-described existing situation, after analysis, if the gateway only processes the data packet sent by the client or the server after a connection is established between the client and the server by synchronous proxy mechanism, it is possible to take full advantage of the gateway and the traffic, thus reducing the time delay and improving the user experience. In view of the above, the present disclosure is proposed.

SUMMARY

In view of the above, a data transmission method, a server, a gateway, and a computer-readable medium are provided according to embodiments of the present disclosure, with the purpose of at least solving at least one of the above technical problems in the related art and providing at least one advantageous option.

In order to solve the above-mentioned problems in the related art (i.e., the problems to be solved), in one aspect, a data transmission method is provided according to the present disclosure. A message sent by a server is directly sent to a client without passing through a gateway, and therefore the performance of the gateway defending against a DDOS attack is improved, and the processing time delay of the gateway is reduced. In another aspect, a server, a gateway, and a computer-readable storage medium are further provided according to the present disclosure.

In order to achieve the above objects, according to an aspect of the present disclosure, a data transmission method is provided according to an embodiment of the present disclosure. The method includes:

establishing, by a server, a connection with a client according to a transmission control protocol (TCP) through a gateway with a synchronous proxy mechanism;

acquiring, by the server, sequence number conversion information and converting a first TCP sequence number of a first data packet to be sent to the client according to the sequence number conversion information, so that the first TCP sequence number is matched, by the server, with a first acknowledgment number of the second data packet sent by the client; and sending, by the server, the first data packet, for which the first TCP sequence number has been converted, to the client directly.

In the data transmission method according to the embodiment of the present disclosure, the converting a first TCP sequence number of a first data packet to be sent to the client according to the sequence number conversion information comprises:

converting, by the server, the first TCP sequence number according to the following formula:

$$seq_{server} = ack\_seq_{client} + \text{delta}$$

wherein $seq_{server}$ represents the first TCP sequence number of the first data packet sent by the server to the client, $ack\_seq_{client}$ represents the first acknowledgment number of the data packet sent by the client to the gateway, and delta represents the sequence number conversion information.

In the data transmission method according to the embodiment of the present disclosure, the sequence number conversion information comprises a difference between a first initial sequence number selected by the gateway when the gateway sends a first synchronization/acknowledgement message to the client and a second initial sequence number selected by the server when the server sends a second synchronization/acknowledgement message to the gateway.

In the data transmission method according to the embodiment of the present disclosure, acquiring, by the server, sequence number conversion information comprises: acquiring, by the server, the sequence number conversion information from the gateway.

In the data transmission method according to the embodiment of the present disclosure, the acquiring, by the server, sequence number conversion information comprises: searching, by the server, a table of local connection information to acquire the sequence number conversion information pre-acquired from the gateway and stored in the table of local connection information.

In the data transmission method according to the embodiment of the present disclosure, the acquiring, by the server, sequence number conversion information further comprises: identifying, by the server, a type of a received packet, wherein the type of the received packet comprises one of a syn packet, a second acknowledgment packet and a third data packet that are sent by the gateway to the server.

In another aspect of the present disclosure, a data transmission method is further provided according to an embodiment of the present disclosure, the method including:

establishing, by a gateway, a connection between a client and a server according to a transmission control protocol (TCP) with a synchronous proxy mechanism; and acquiring, by the gateway, TCP sequence number conversion information and sending it to the server so that the server converts a first TCP sequence number of a first data packet to be sent to the client, such that the first TCP sequence number matches with a first acknowledgment sequence number of a second data packet sent by the client.

In the embodiment of the data transmission method of the present disclosure, acquiring, by the gateway, sequence number conversion information and sending it to the server:

acquiring, by the gateway, a first initial sequence number selected by the gateway according to a first synchronization/acknowledgement message to be sent to the client;

acquiring, by the gateway, a second initial sequence number selected by the server according to a second synchronization/acknowledgement message received from the server; and calculating, by the gateway, a difference between the first initial sequence number selected by the gateway and the second initial sequence number selected by the server, to acquire the TCP sequence number conversion information and send it to the server.

According to further another aspect of the present disclosure, a server is provided according to an embodiment of the present disclosure, which includes: one or more processors; and a storage device, configured for storing one or more programs, wherein when the one or more programs are executed by the one or more processors, the one or more processors are caused to implement the methods described above.

According to still further another aspect of the present disclosure, a gateway is further provided according to an embodiment of the present disclosure, which includes: a sequence number calculating module and an information sending module, wherein the sequence number calculating module is configured for: acquiring a first initial sequence number selected by the gateway according to a first synchronization/acknowledgement message to be sent to the client; acquiring a second initial sequence number selected by the server according to a second synchronization/acknowledgement message received from the server; and calculating a difference between the first initial sequence and the second initial sequence number so as to acquire transmission control protocol (TCP) sequence number conversion information; wherein the information sending module is configured for sending the TCP sequence number conversion information to the server.

According to yet another aspect of the present disclosure, a computer-readable storage medium is provided according to an embodiment of the present disclosure, in which a computer program is stored. The program, when executed by a processor, implements the methods described above.

With the data transmission method and gateway as well as the server according to the embodiments of the present disclosure, after the transmission control protocol connection is established between the client and the server through the synchronous proxy mechanism, the server converts the TCP sequence number for the data packet to be sent to the client, then the server directly sends the data packet for which the TCP sequence number has been converted to the client. Therefore, the gateway only processes incoming traffic and does not process outgoing traffic, which reduces the association of incoming and outgoing traffics and improves the traffic, to which the gateway is subjected to, thereby improving the user experience and reducing the cost.

By simply illustrating several specific embodiments and implementations that are contemplated as the best modes for carrying out the disclosure, other aspects, features, and advantages of the present disclosure will be readily appreciated from the following detailed description. There are also other different embodiments of the present disclosure, and details of the present disclosure can be modified in many obvious aspects without departing from the spirit and scope of the present disclosure. Accordingly, the accompanying drawings and description should be regarded as illustrative rather than being restrictive.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

FIG. 5A is a table illustrating an initial sequence number generated by a gateway according to an embodiment of the present disclosure.

FIG. 5B is a table illustrating a custom TCP option of a syn packet sent by a gateway according to an embodiment of the present disclosure.

FIG. 5C is a table illustrating seq_info information in an ack sent by a gateway to a server using a custom TCP option according to an embodiment of the present disclosure.

DETAILED DESCRIPTION

Hereinafter, only some exemplary embodiments are simply described. As can be recognized by those skilled in the art, the described embodiments may be modified in various different ways without departing from the spirit or scope of the present disclosure. Accordingly, the drawings and the description should be considered as illustrative in nature instead of being restrictive.

In the existing synchronous proxy mechanism for a gateway, after a TCP connection is established between the client and the server, the data packet sent from the server to the client needs to be relayed by the gateway. Therefore, the gateway needs to process incoming and outgoing traffic, which raises a high requirement on the processing capability of the gateway, and reduces user experience. Therefore, there is a need in the art for reducing the requirement on the processing capability of the gateway.

A basic concept of the embodiments of the present disclosure lies in that: with a synchronous proxy mechanism, a connection is established between the client and the server through the gateway, and then the server converts a first TCP sequence number for a first data packet to be sent to the client according to TCP sequence number conversion information received.

Embodiment 1: A General Flowchart of a Data Transmission Method

Figure 1:
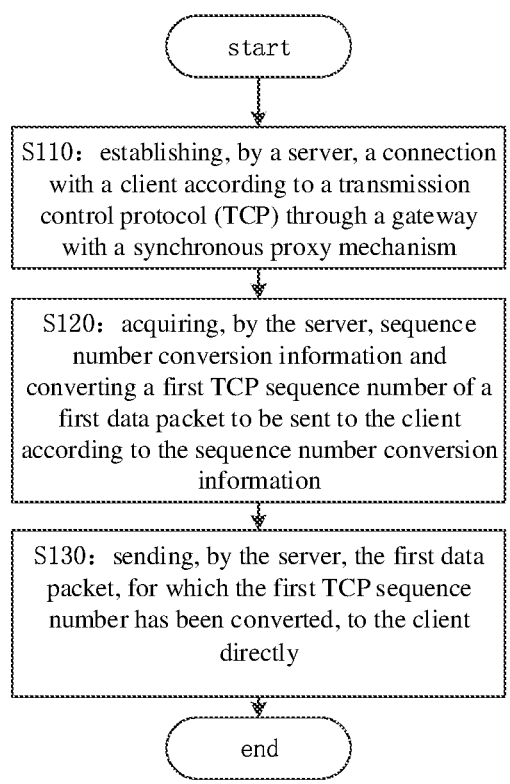
FIG. 1 is a schematic flowchart of a data transmission method according to an embodiment of the present disclosure.

FIG. 1 shows a schematic flowchart of a data transmission method according to an embodiment of the present disclosure. As shown in FIG. 1, the data transmission method according to the embodiment of the present disclosure includes:

S110, establishing, by a server, a connection with a client according to a transmission control protocol (TCP) through a gateway with a synchronous proxy mechanism;

S120, acquiring, by the server, sequence number conversion information and converting a first TCP sequence number of a first data packet to be sent to the client according to the sequence number conversion information so that the first TCP sequence number is matched, by the server, with a first acknowledgment number of a second data packet sent by the client, wherein the sequence number conversion information comprises a difference between a first initial sequence number selected by the gateway when the gateway sends a first synchronization/acknowledgement message to the client and a second initial sequence number selected by the server when the server sends a second synchronization/acknowledgement message to the gateway; and S130, sending, by the server, the first data packet, for which the first TCP sequence number has been converted, to the client directly.

In this way, the server directly sends a data packet to the client without relaying by the gateway.

In the step S120, in order to convert the first TCP sequence number by the server, the TCP sequence number conversion information is firstly acquired by the server, and then by the server, the first sequence number is converted according to the TCP sequence number conversion information. A second ack number of a first data packet to be sent to the client remains unchanged, and the first sequence number is necessary to be converted according to the following formula.

$$seq_{server} = ack\_seq_{client} + \text{delta}$$

wherein $seq_{server}$ represents the first TCP sequence number of the first data packet sent by the server to the client, $ack\_seq_{client}$ represents the first acknowledgment number of the second data packet sent by the client to the gateway, and delta represents the TCP sequence number conversion information.

In order to acquire the TCP sequence number conversion information, according to a first syn/ack message to be sent to the client, the gateway acquires a first initial sequence number selected by the gateway, and according to a second syn/ack message received from the server, acquires a second initial sequence number selected by the server. Then, the gateway calculates a difference between the first initial sequence number selected by the gateway and the second initial sequence number selected by the server to acquire the TCP sequence number conversion information, and sends it to the server. In particular, the server stores the TCP sequence number conversion information received in a table of local connection information.

After receiving the second data packet sent by the client and relayed by the gateway, the server receives the TCP sequence number conversion information from the gateway, or acquires the stored TCP sequence number conversion information by searching the table of local connection information of the server.

Embodiment 2: Another General Flowchart of a Data Transmission Method

Figure 2:
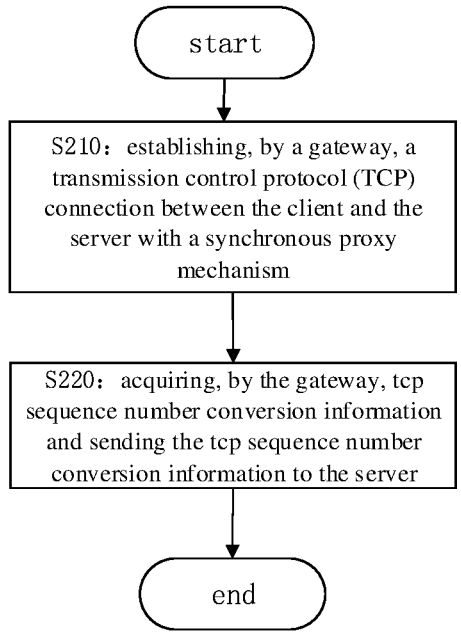
FIG. 2 is a schematic flowchart of a data transmission method according to another embodiment of the present disclosure.

FIG. 2 shows a schematic flowchart of a data transmission method according to another embodiment of the present disclosure. As shown in FIG. 2, the data transmission method according to this embodiment of the present disclosure includes:

S210, establishing, by a gateway, a transmission control protocol (TCP) connection between the client and the server with a synchronous proxy mechanism; and S220, acquiring, by the gateway, TCP sequence number conversion information and sending the TCP sequence number conversion information to the server so that a first TCP sequence number of a first data packet to be sent to the client matches with a first acknowledgment number of a second data packet sent by the client.

In this way, the server directly sends the data packet to the client without relaying by the gateway.

In the step S220, according to the first syn/ack message to be sent to the client, the gateway acquires a first initial sequence number selected by the gateway; according to a second syn/ack message received from the server, the gateway acquires a second initial sequence number selected by the server; and the gateway calculates a difference between the first initial sequence number and the second initial sequence number, acquires the TCP sequence number conversion information and sends it to the server.

Embodiment 3: A Server

Figure 3:
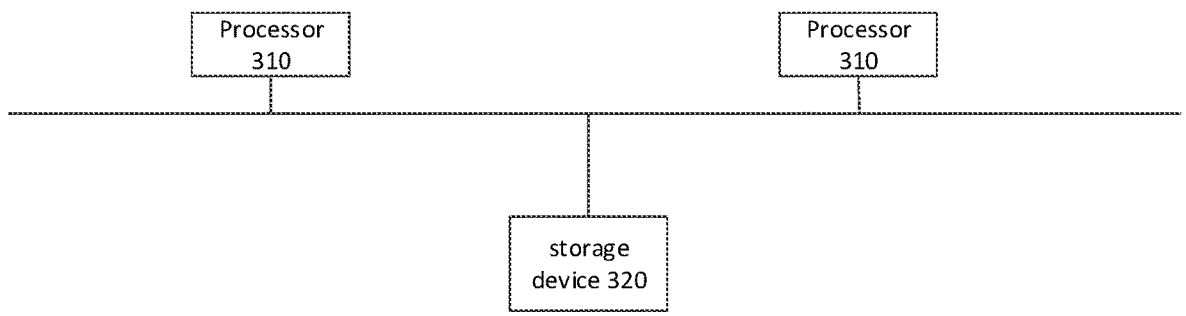
FIG. 3 is a schematic structural diagram of a server according to further another embodiment of the present disclosure.

A server is further provided according to an embodiment of the present disclosure. As shown in FIG. 3, the server includes:

one or more processors 310; and a storage device 320, configured for storing one or more programs.

When the one or more programs are executed by the one or more processors 310, the one or more processors 310 are caused to implement the data transmission methods according to the embodiments of the disclosure.

Embodiment 4: A Gateway

Figure 4:
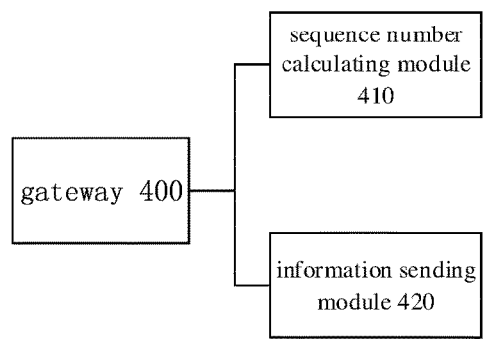
FIG. 4 is a schematic structural diagram of a gateway according to still further another embodiment of the present disclosure.

A gateway 400 is further provided according to an embodiment of the present disclosure. As shown in FIG. 4, the gateway 400 includes: a sequence number calculating module 410 and an information sending module 420.

The sequence number calculating module 410 is configured for acquiring a first initial sequence number of the gateway according to a first syn/ack message to be sent to the client, acquiring a second initial sequence number of a server according to a second syn/ack message received from the server, and calculating a difference between the first initial sequence number and the second initial sequence number to acquire TCP sequence number conversion information.

The information sending module 420 is configured for sending the TCP sequence number conversion information to the server.

Embodiment 5: A Computer-Readable Medium

A computer-readable medium is further provided according to an embodiment of the present disclosure, in which a computer program is stored. The program, when executed by a processor, implements the methods according to Embodiment 1 and Embodiment 2 of the disclosure.

In the data transmission method according to the embodiments of the present disclosure, the flowing process of data among the client, the gateway and the server is described as follows.

Firstly, the client sends a syn packet to the gateway.

Next, the gateway, according to the syn proxy mechanism, generates an initial sequence number, and sends a syn/ack message to the client.

Next, the client sends an ack message to the gateway.

Next, the gateway sends a syn packet to the server, and, acting as the client, establishes a connection with the server, wherein the syn packet carries a client source IP and port information through a TCP option.

Next, the server sends a syn/ack message to the gateway.

Then, the gateway sends an ack message to the server to establish of connection.

Next, after the connection being established, the gateway sends sequence number conversion information to the server.

Next, the client sends a data packet to the gateway.

Then, the gateway forwards the data packet to the server, and the server converts the TCP sequence number of the data packet after receiving the data packet.

Finally, the server sends a data packet to the client.

In the data transmission method according to the embodiment of the present disclosure, the gateway is configured to, acting as the server, establish a connection with the client with the syn proxy mechanism, which may be performed by the following six stages.

In a first stage, the gateway generates an initial sequence number and sends a syn/ack message to the client.

In a second stage, the gateway verifies an ack packet sent by the client.

In a third stage, the gateway sends a syn packet to the server to establish a connection therewith.

In a fourth stage, after receiving a syn/ack message sent by the server, the gateway sends an ack packet to the server to establish a connection.

In the fifth stage, the gateway sends TCP sequence number information to the server.

In the sixth stage, after the connection being established, the gateway converts the sequence number in the syn/ack message and sends the converted sequence number to the server.

After the gateway receives the syn packet, since the TCP option is included in the syn packet, in order to support the above description, the initial sequence number is required to include option information, which mainly includes whether sack is supported, wscale and mss. The information is carried for supporting the above options when the gateway establishes a connection to the server. On the other hand, if the mss option is used in the client, since the gateway establishes a connection as a proxy of the server, the mss carried in the syn/ack sent by the gateway to the client is required to be supported by the server. The sequence number in the TCP is a 32-bit unsigned integer, and the above TCP options and the timestamp are encoded into a 32-bit unsigned integer.

The initial sequence number are shown in the table illustrated in FIG. 5A, wherein the timestamp has a length of 8 bits, the unit of time is minutes, other items are set according to an actual value of an option, and others are reserved bits.

Process of Establishing the Connection Between Gateway and Server

The verification logic of Ack is based on the acknowledgement logic of the TCP, that is, the acknowledgement number is equal to the next sequence number to be sent. Since the syn packet occupies a sequence number, the ack_seq contained in the ack packet sent by the client is equal to the initial sequence number plus one. After the ack is parsed, data of each field shown in Table 1 may be recovered based on the ack_seq. The time interval between the time corresponding to the timestamp and the current time is verified whether it is less than a preset threshold. The threshold is set to be 3 minutes.

After the ack has been verified, a connection is established, and a connection table is updated. Then a server is selected, and a backend_ip and a backend_port are selected, wherein the backend_ip and the backend_port are used to establish a connection to the server. During the duration of the TCP connection, the ip and port are used only by this connection. The ip and port may be reused only after the TCP connection is disconnected.

When the gateway sends a syn packet to the server, in order to enable the server to directly send data to the client, the syn packet carries the ip and port of the client, as well as the vip and vport of the client through a custom TCP option, wherein the type number of customized option is 200.

The custom option is shown in the table illustrated in FIG. 5B, wherein 200 represents the type of a TCP option, 16 represents the total length of the option, including the option header, rst represents reserved 2 bytes, cip and cport represent source ip and port of the client, and vip and vport represent addresses of a virtual service.

Maintenance of a TCP Sequence Number

After receiving the syn/ack message sent by the server, the gateway sends an ack message to the server to establish the connection. At this time, the gateway records the difference delta of the initial sequence number. Delta may be calculated by the following formula:

$$delta = N - M$$

wherein N represents the sequence number in the syn/ack message sent by the gateway to the client, that is, the initial sequence number selected by the gateway, and M represents the sequence number in the syn/ack message sent by the server to the gateway, that is, the initial sequence number selected by the server.

After the connection is established, a TCP sequence number of a message sent by the client and received by the gateway subsequently needs to be converted. The logic for the conversion is described as follows.

a: the message received from the client has an unchanged seq number.

b: the message received from the client is converted according to the following conversion formula.

$$ack\_seq_{server} = ack\_seq_{client} - delta$$

In the above formula, $ack\_seq_{client}$ and $ack\_seq_{server}$ represent the ack numbers in the messages sent by the client and the server respectively.

When the gateway sends an ack to the server, by using a custom TCP option, seq_info information, i.e., delta is carried.

The type of the used custom option is 201, as shown in the table illustrated in FIG. 5C, wherein 201 represents type of the custom option, the total length of the option is 8 bytes, reserve represents reserved 2 bytes, and delta occupies 4 bytes.

Processing Logic of the Server

The server is connected to the kernel netfilter through a kernel module. When receiving or sending a message, it is necessary to process the message by the kernel module.

Processing Logic to a Syn Packet

After receiving a syn packet, the server parses the custom option 200. After the parsing, local connection information is created based on 5-tuple information (including source ip, destination ip, source port, destination port, and protocol number), and the local connection information is used to record the client source ip/port information carried in the syn packet.

A timeout for trigging the establishment of a new connection by the syn packet may be set according to the round trip time between the actual gateway device and the server. Typically, the timeout is set to be 2-10 seconds, that is, the gateway device should establish a connection with the server within 2-10 seconds.

The server does not perform any further processing on the received syn packet, and after that the message continues to be processed by the protocol stack.

Processing Logic to an Ack Packet

After receiving the ack packet, according to the 5-tuple information, the server searches the local connection information, parses the TCP message header to check whether this message carries the custom option 201, and updates the connection information according to the custom option 201.

The server does not perform any processing on the received non-syn packet, and after that, the message continues to be processed by the protocol stack.

Data Transmission at the Server

After the connection is established, a message sent by the server is sent directly to the client without passing through the gateway.

The sequence number conversion information is included in the local connection information of the server. When the message is sent, the local connection information is firstly searched according to the 5-tuple information, and the sequence number seq in the message is converted according to the sequence number conversion information included in the local connection information. The logic for converting a sequence number is described as follows.

a: the ack_seq in a message to be sent to the client remains unchanged.

b: the seq in a message to be sent to the client needs to be converted. The conversion rule is:

$$seq_{server} = ack\_seq_{client} + delta$$

wherein $seq_{server}$ represents the TCP sequence number of the data packet sent by the server to the client, and $ack\_seq_{client}$ represents the acknowledgment number of the data packet sent by the client to the gateway.

When sending a syn/ack to the gateway device, the server does not perform any processing, and the syn/ack is processed by the protocol stack.

The real ip and port of the client are both included in the local connection information of the server. After the local connection information being searched, the server converts the destination address and port. In addition, since the destination ip and port accessed by the client are directed to a virtual ip, both the source address and destination address need to be converted.

Destruction of the Local Connection Information of the Server

The local connection information of the server is generated after the syn packet sent by the gateway is received. After the local connection information is generated, it has a status of SYN_RECV. In this case, the local connection information is destructed when the timer is timed-out. The corresponding timeout is 2-10 seconds.

After receiving the ack packet, the server updates the status thereof to ESTABLISHED if the custom option 201 is obtained. In this case, the timeout is no longer set. When the sock corresponding to the connection is released, the connection information is destructed.

With the method, the server, the gateway and the computer-readable medium according to the embodiments of the present disclosure, after the TCP connection between the client and the server is established through the gateway synchronous proxy mechanism, the server converts the sequence number for the data packet sent by the client and relayed by the gateway. Therefore, the gateway only processes incoming traffic and does not process outgoing traffic, which reduces the association of incoming and outgoing traffics and improves the traffic to which the gateway is subjected, thus shortening the network processing delay, improving the user experience and reducing the cost.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing a particular logical function or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logic and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can acquire instructions from the instruction execution system, apparatus or device and execute these instructions) or for use in conjunction with the instruction execution system, apparatus or device. For the purposes of the present specification, "computer-readable medium" can be any means that can contain, store, communicate, propagate or transmit programs for use by an instruction execution system, apparatus or device or for use in conjunction with the instruction execution system, apparatus or device. More specific examples (non-exhaustive list) of computer-readable medium include: electrical connection parts (electronic devices) having one or more wires, portable computer disk cartridges (magnetic devices), random access memory (RAM), read only memory (ROM), erasable programmable read only memory (EPROM or flash memory), fiber optic devices, and portable read only memory (CDROM). In addition, the computer-readable medium may even be a paper or other suitable medium on which the programs can be printed. This is because for example the paper or other medium can be optically scanned, followed by editing, interpretation or, if necessary, other suitable ways of processing so as to acquire the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. A data transmission method, the method comprising:
    establishing, by a server, a connection with a client according to a transmission control protocol (TCP) through a gateway with a synchronous proxy mechanism;
    acquiring, by the server, sequence number conversion information, and converting a first TCP sequence number of a first data packet to be sent to the client according to the sequence number conversion information, so that the first TCP sequence number is matched, by the server, with a first acknowledgment number of a second data packet sent by the client; and
    sending, by the server, the first data packet, for which the first TCP sequence number has been converted, to the client directly.

2. The method of claim 1, wherein converting the first TCP sequence number of the first data packet to be sent to the client according to the sequence number conversion information comprises:
    converting, by the server, the first TCP sequence number according to the following formula:

$$seq_{server} = ack\_seq_{client} + delta$$

wherein $seq_{server}$ represents the first TCP sequence number of the first data packet sent by the server to the client, $ack\_seq_{client}$ represents the first acknowledgment number of the second data packet sent by the client, and delta represents the sequence number conversion information.

3. The method of claim 1, wherein the sequence number conversion information comprises a difference between a first initial sequence number selected by the gateway when the gateway sends a first synchronization/acknowledgement message to the client and a second initial sequence number selected by the server when the server sends a second synchronization/acknowledgement message to the gateway.

4. The method of claim 1, wherein acquiring, by the server, sequence number conversion information comprises:
    acquiring, by the server, the sequence number conversion information from the gateway.

5. The method of claim 1, wherein acquiring, by the server, sequence number conversion information comprises:
    searching, by the server, a table of local connection information to acquire the sequence number conversion information pre-acquired from the gateway and stored in the table of local connection information.

6. The method of claim 1, wherein acquiring, by the server, sequence number conversion information further comprises:
    identifying, by the server, a type of a received packet, wherein the type of the received packet comprises one of a syn packet, a second acknowledgment packet and a third data packet that are sent by the gateway to the server.

7. A data transmission method, the method comprising:
establishing, by a gateway, a connection between a client and a server according to a transmission control protocol (TCP) with a synchronous proxy mechanism; and
acquiring, by the gateway, TCP sequence number conversion information and sending the TCP sequence number conversion information to the server so that the server converts a first TCP sequence number of a first data packet to be sent to the client, such that the first TCP sequence number matches with a first acknowledgment sequence number of a second data packet sent by the client.

8. The method of claim 7, wherein acquiring, by the gateway, TCP sequence number conversion information and sending the TCP sequence number conversion information to the server comprises:
acquiring, by the gateway, a first initial sequence number selected by the gateway according to a first synchronization/acknowledgement message to be sent to the client;
acquiring, by the gateway, a second initial sequence number selected by the server according to a second synchronization/acknowledgement message received from the server; and
calculating, by the gateway, a difference between the first initial sequence and the second initial sequence number so as to acquire transmission control protocol (TCP) sequence number conversion information, and sending the TCP sequence number conversion information to the server.

9. A server, comprising:
one or more processors; and
a storage device, configured for storing one or more programs;
wherein when the one or more programs are executed by the one or more processors, the one or more processors are caused to implement the method of claim 1.

10. A gateway, comprising:
one or more processors; and
a storage device, configured for storing one or more programs,
wherein the one or more programs, when executed by the one or more processors, cause the one or more processors to perform an operation comprising:
acquiring a first initial sequence number selected by the gateway according to a first synchronization/acknowledgement message to be sent to a client;
acquiring, by the gateway, a second initial sequence number selected by a server according to a second synchronization/acknowledgement message received from the server;
calculating, by the gateway, a difference between the first initial sequence selected by the gateway and the second initial sequence number selected by the server so as to acquire transmission control protocol (TCP) sequence number conversion information; and
sending the TCP sequence number conversion information to the server.

11. A non-transitory computer-readable storage medium, in which a computer program is stored, wherein the program, when executed by a processor, implements the method of claim 1.

* * * * *